United States Patent [19]

Makris et al.

[11] Patent Number: 5,713,734
[45] Date of Patent: Feb. 3, 1998

[54] EQUIPMENT FOR AND METHOD OF CALCINATION OF MINERAL MATERIALS WITH REDUCED EMISSION OF NITROGEN OXIDES

[75] Inventors: Michel Makris, Chatou; Jacques Dupuis, Chazay D'Azergues; Jean-Luc Sue, Saint Etienne, all of France

[73] Assignee: TECHNIP, Courbevoie, France

[21] Appl. No.: 690,245

[22] Filed: Jul. 19, 1996

[30] Foreign Application Priority Data

Jul. 21, 1995 [FR] France ................... 95 08905

[51] Int. Cl.$^6$ .................................................. F27B 15/00
[52] U.S. Cl. ............................ 432/106; 432/14; 432/58
[58] Field of Search ............................ 432/14, 58, 106

[56] References Cited

U.S. PATENT DOCUMENTS

| 4,514,170 | 4/1985 | Kupper | 432/106 |
|---|---|---|---|
| 4,530,661 | 7/1985 | Herchenbach et al. | 432/106 |
| 4,568,276 | 2/1986 | Fujisawa | 432/106 |
| 4,747,879 | 5/1988 | Wolter et al. | 432/14 |
| 4,929,178 | 5/1990 | Maury et al. | 432/14 |
| 5,364,265 | 11/1994 | Paliard | 432/14 |
| 5,454,714 | 10/1995 | Paliard | 432/14 |

FOREIGN PATENT DOCUMENTS

| 0 313 871 | 10/1988 | European Pat. Off. |
| 0 572 322 | 12/1993 | European Pat. Off. |

OTHER PUBLICATIONS

E. Steinbiss, "Erfahrugen mit der Vorcalcinierung unter Berücksichtigung von Ersatzbrennstoffen", *Zement-Kalk-Gips*, vol. 32, No. 5 (May 1979) pp. 211–221.

Y. Ueda et al., "Coal firing of reinforced suspension preheater (RSP) process", *Zement-Kalk-Gips*, vol. 36, No. 4 (Apr. 1983) pp. 199–207.

M. Champonnois, "Latest developments in precalcination", *Zement-Kalk-Gips*, vol. 41, No. 3 (Mar. 1988) pp. 118–124.

W.H. Duda, "Suspension preheaters with precalciner", *Cement-Data-Book*, vol. 1, 3rd. Ed. (1985) pp. 473–519.

*Primary Examiner*—Henry A. Bennett
*Assistant Examiner*—Gregory A. Wilson
*Attorney, Agent, or Firm*—Pennie & Edmonds LLP

[57] ABSTRACT

An equipment for and a method of calcining mineral materials comprising a precalciner consisting of a combustion zone followed by a reaction zone and then by a contact zone and by a post-combustion zone, the latter communicating itself with a separating cyclone, the reaction zone being fed with smokes coming from a firing furnace, the supply of mineral material being distributed between the combustion zone and the contact zone, the invention being applicable in particular to the manufacture of cement clinker while considerably decreasing the emission of nitrogen oxides.

5 Claims, 3 Drawing Sheets

EQUIPMENT FOR AND METHOD OF CALCINATION OF MINERAL MATERIALS WITH REDUCED EMISSION OF NITROGEN OXIDES

BACKGROUND OF THE INVENTION

The present invention relates to an equipment for the calcination of any mineral materials whatsoever, such for example as raw materials for the manufacture of cement, lime, alumina, magnesia or dolomite comprising at least one precalcination stage interposed between at least one earlier preheating stage and at least one subsequent calcination or firing stage.

It is also directed to a method of calcination of such materials comprising a precalcination step interposed between at least one earlier preheating step and at least one subsequent calcination or firing step.

There has already been proposed equipments for the precalcination of mineral materials in particular comprising a precalciner consisting essentially of a combustion chamber fed with hot air, with fuel or with a mineral material, of a reaction chamber communicating with the combustion chamber and fed on the one hand with effluent from the combustion chamber and on the other hand with smokes containing nitrogen oxides coming from a calcination or firing furnace, these two words being considered here as being equivalent and of a cyclone which receives the effluent from the reaction chamber and separates it into mineral material which is fed to the calcination furnace and into effluent gas which is fed to at least one preheating stage.

The effluent from the reaction chamber consists of a suspension of powdery mineral materials within smokes of combustion of the fuel and of decomposition of the mineral material coming from the combustion chamber of the precalciner and from the calcination furnace.

The document FR-A-2,691,790 discloses an equipment and a process of this type permitting a reduction by about 30% to 70% of the nitrogen oxides generated by the calcination furnace. This equipment is of the kind comprising a precalciner consisting essentially of a combustion chamber fed with hot air, with fuel and with mineral material, of a reaction chamber communicating with the combustion chamber and fed with effluent from the combustion chamber and with smokes rich in nitrogen oxides coming from a calcination furnace and of a cyclone for the separation of the mineral material from the effluent gases, the said cyclone being connected to the reaction chamber by a pipeline or the like; this equipment is characterized in that the feeding of the combustion chamber with hot air is effected by at least one first duct opening into the said chamber, at least one second duct connected to at least one burner mounted onto the said chamber, whereas at least one third hot air duct opens into the duct connecting the reaction chamber to the cyclone. In this equipment, the smokes containing nitrogen oxides coming from the calcination furnace do not flow through the combustion chamber and enter the precalciner at the level of the reaction chamber only.

The document FR-A-2,691,790 also specifies the percentage of air which flows in each one of the three aforesaid ducts.

SUMMARY OF THE INVENTION

The present invention relates to an equipment and to a method owing to which the rate of removal of the nitrogen oxides is further increased with respect to the equipment and to the method according to the document FR-A-2,691,790 and which allows the use of gaseous fuels, liquids or solids the chemical composition or the combustion characterising features of which are likely to generate nitrogen oxides.

Moreover, this equipment according to a preferred embodiment of the invention also permits owing to its particular arrangement, the use of fuels of poorer quality which therefore are not very expensive.

The equipment for the calcination of mineral material in powdery form according to the invention is of the type comprising means for preheating a powdery mineral material, means for precalcining the preheated mineral material, connected to the preheating means, and means for calcining (or firing) the precalcined mineral material, connected to the precalcination means.

In such an equipment, the precalcination means essentially comprise:

a) at least one combustion zone (or chamber) comprising means for supplying hot air, one part of the preheated mineral material coming from the preheating means and fuel, b) at least one reaction zone (or chamber) communicating with the combustion zone and comprising means for supplying smokes of fuel combustion and of residual decomposition of the mineral material coming from the calcination (or firing) means, c) at least one post-combustion zone (or chamber) comprising hot air supplying means and d) at least one cyclone the inlet of which communicates with the post-combustion zone and the outlets communicate with the preheating means and with the calcining means, respectively.

The equipment is characterized in that it comprises a contact zone interposed between the reaction zone and the post-combustion zone, the said contact zone comprising means for supplying preheated mineral material coming from the preheating means without having passed through the combustion zone and the reaction zone.

The method according to the invention of calcining mineral materials comprises the passage of the mineral material successively into a preheating zone, a precalcining zone and a calcining zone, the precalcining zone successively comprising a combustion zone, a reaction zone, a contact zone, a post-combustion zone and a zone of separation between the mineral material and the combustion gases, the supply of the combustion zone with sub stoichiometric air, the supply of the post-combustion zone with air, the separate supply of the combustion zone and of the contact zone with preheated mineral material coming from the preheating zone, the supply of the reaction zone with smokes containing nitrogen oxides and coming from the calcining zone, the starting of the flow of the effluent from the combustion zone successively through the reaction zone, the contact zone, the post-combustion zone and the separation zone, the conveyance of the combustion gases separated in the separation zone towards the preheating zone and the conveyance of the mineral material separated in the separation zone towards the combustion zone with respect to the total amount of mineral material feeding the calcination zone, the proportion of mineral material feeding the precalcining zone being controlled in order to have a temperature of the effluent from the combustion zone lying between 950° C. and 1,200° C. and preferably between 1,000° C. and 1,100° C. at the inlet of the reaction zone.

The combination of a sub-stoichiometric combustion and of a high temperature at the outlet of the combustion zone are creating particularly favourable conditions for the reduction of the nitrogen oxides.

The proportion of mineral material thus defined obviously depends in each particular case on a number of factors such as the nature of the fuel, its amount, its combustible power or value and the thermal energy provided by the combustion etc. It could be determined by theoretical considerations and/or by a simple experimentation. It would generally represent from 50% to 90% of the total amount of mineral material, the complement being carried to the contact zone.

BRIEF DESCRIPTION OF THE DRAWINGS

The invention will be better understood and further characterizing features, details and advantages thereof will appear better as the following explanatory description proceeds with reference to the accompanying diagrammatic drawings given by way of a non limiting example only illustrating a presently preferred specific embodiment of the invention and in which.

DETAILED DESCRIPTION OF THE INVENTION

Figure 1:
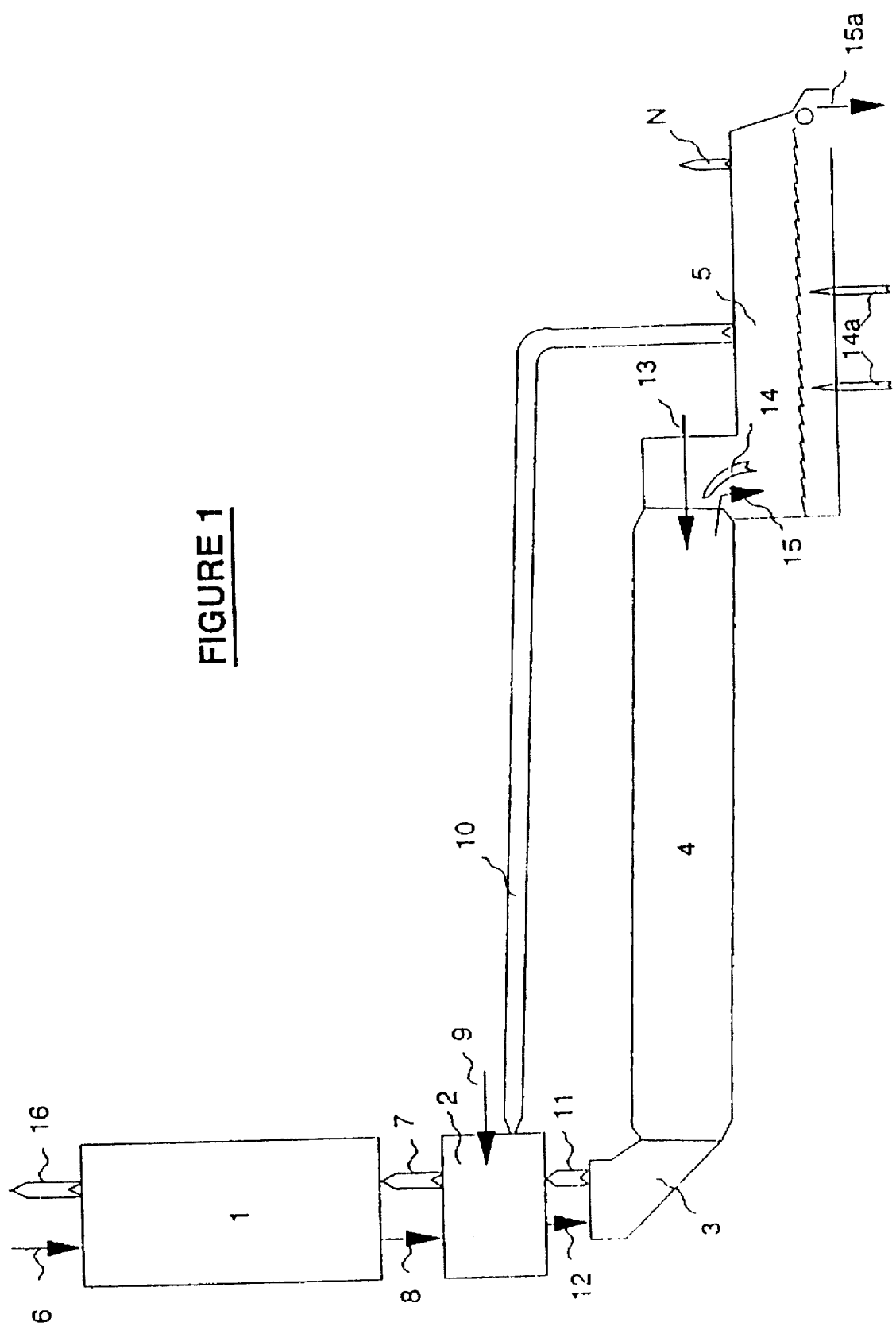
FIG. 1 is a diagrammatic view of an equipment for firing mineral materials, into which is incorporated a precalciner according to this invention.

Referring to FIG. 1, there is seen an equipment for firing mineral materials, wherein the material supplied in a pulverized state moves successively through a preheater 1, a precalciner 2, a calcining or firing furnace 4 for example of the rotary furnace type and a cooler 5.

The powdered material is fed at 6 to the preheater 1 in which the hot smokes 7 issuing from the precalciner 2 are preheating the said material and are then discharged at 16 by means of a fan or blower not shown.

The hot material 8 exiting from the preheater 1 is essentially precalcined in the precalciner 2 by a supply of energy originating on the one hand from the combustion of a fuel 9 with preheated air arriving through a pipeline 10 from the cooler 5 and on the other hand from the smokes 11 coming from the furnace 4 for example through a junction box 3.

The precalcined material 12 is fed to the furnace 4 through the junction box 3 for completing the calcination or the firing by a supply of energy originating from the combustion of a fuel 13 with preheated air 14 coming from the cooler 5. The calcined (according to the material fired, clinkerized or molten) product 15 exiting from the furnace 4 is cooled in the cooler 5 by means of an exchange with cool air 14a fed into the latter and then the product is discharged at 15a.

Figure 2:
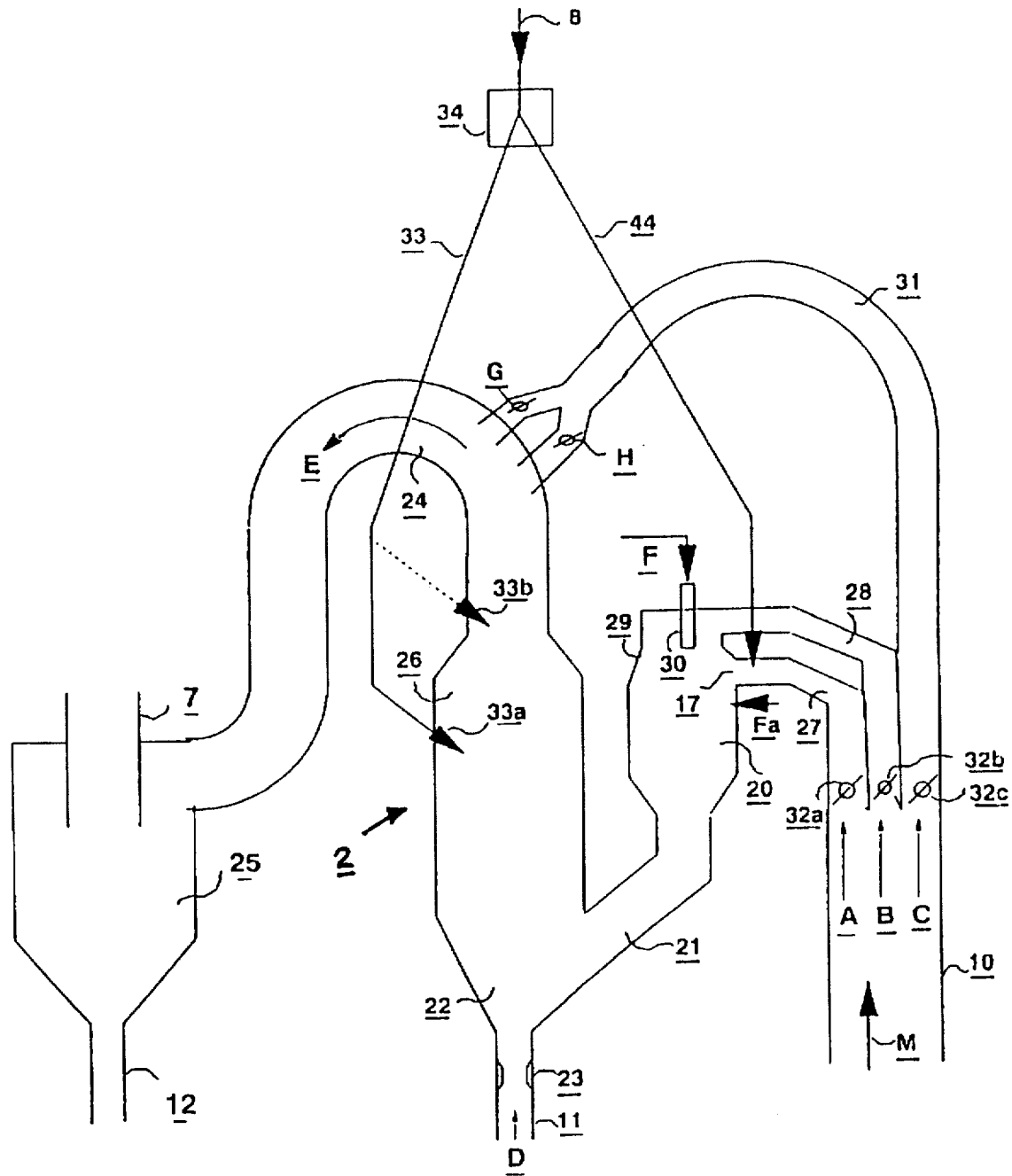
FIG. 2 is a detailed yet diagrammatic view of this precalciner.

At least one portion of the hot air recovered from the cooler 5, such as the one passing in the pipeline 10 is used as combustion air in the precalciner 2 as physically shown by the arrow M on FIG. 2.

The arrow N on FIG. 1 illustrates the possible access of hot air exiting from the cooler 5 and intended for other uses.

On FIG. 2, there is seen that the precalciner proper consists of a combustion chamber (or zone) 20 which according to the invention receives one portion only of the preheated mineral batch coming from the preheater 1 through the pipeline 8 which is subdivided into two branch lines 33 and 44. The material of the branch line 44 alone reaches the combustion chamber either directly or preferably by being previously put in suspension at 17 in a stream of hot air such as the one from the duct 27. The combustion chamber 20 is connected for example through a shaft 21 to the reaction chamber 22, the latter being connected through the medium of the duct 11 and of a valve or a restriction 23 to the junction box 3 from which are exiting the smokes (arrow D) entering the reaction chamber at its lower portion. At its upper portion, the reaction chamber 22 communicates with a contact chamber or zone 26 which receives at 33a one portion of the mineral batch to be precalcined through the duct 33 and communicates with its upper portion with a post-combustion duct (or zone) 24 preferably in the shape of a swan-neck opening (arrow E) into a cyclone 25 permitting the recovery of the precalcined product at 12 whereas the combustion smokes or gases are carried by the duct 7 to one or several preheating stages of the mineral batch.

According to a preferred embodiment and in accordance with the document FR-A-2,691,790, the hot air M enters the precalciner 2 through a pipeline 10 which is subdivided into at least three ducts, namely a first duct 27 opening tangentially into the combustion chamber 20, a second duct 28 opening tangentially for example through a volute casing 29 in the upper part of the said chamber 20 at the level of a burner 30 fitting this chamber and a third duct 31 opening at one or several points into the post-combustion duct or chamber 24 connecting the contact chamber 26 to the cyclone 25.

It should be pointed that the first duct 27 and the second duct 28 are preferably imparting to the hot air a same direction of rotation in the combustion chamber 20.

The burner 30 receives fuel physically shown by the arrows F and Fa and this fuel injection may be carried out at will through either one of the locations or through both of them.

According to a less preferred alternative embodiment usable with fuels easy to be burnt, the combustion chamber 20 has a simple construction and may only comprise an air supply 27 or 28, a fuel supply F or Fa, a supply of mineral material 44 and an outlet 21.

The hot air flow exiting from the third duct 31 may as shown be divided into several streams controlled for example by valves G and H.

There has been shown a set of valves for adjusting the flow rate of hot air reaching on the one hand via the first duct 27 (valve 32a) the combustion chamber 20 (arrow A) and on the other hand the second and third ducts 28 and 31 (arrows B and C, respectively) with the valves 32b and 32c, respectively.

It should be pointed out that the combustion gases or smokes from the furnace 4 do not flow through the combustion chamber 20.

The contact zone 26 receives the effluent from the reaction chamber 22 consisting of the partially decarbonated mineral material fed from 44 and in suspension in the combustion smokes originating from the combustion chamber 20 via the duct 21 and from the calcination furnace 4 via the duct 11 and a second portion of the mineral material to be precalcined, fed by the duct 33.

This contact zone is preferably provided with devices of the material distributor type (with baffles or scoops) which distribute the material by falling and then taking up and suspending the mineral material fed into this zone by the effluent from the reaction zone and to avoid a direct fall towards the reaction zone 22, which would result in a cooling and disturbances of this zone 22.

In this contact zone 26 are effected a heat exchange and a stirring between the mineral material fed by the duct 33 and the effluent from the reaction chamber 22.

The chambers 22 and 26 have been shown as a continuous space. It should be understood that these spaces may be separated for example by a junction or connecting pipeline.

In that case, the taking up again of the second portion of the mineral material to be precalcined coming from the duct 33 is promoted by the increase of speed and the jet effect of the suspension coming from the combustion chamber.

Figure 3:
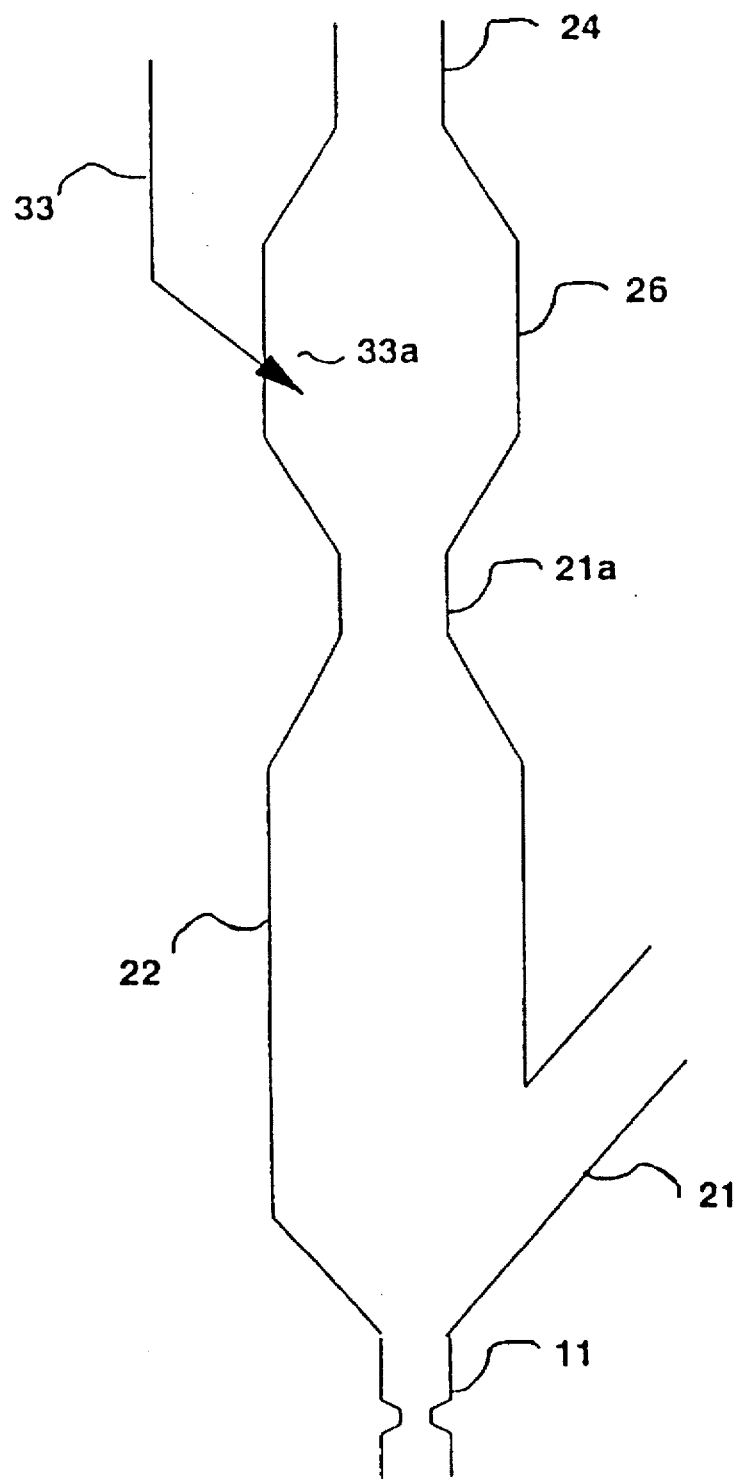
FIG. 3 shows an alternative embodiment of the reaction and contact zones of the precalciner.

FIG. 3 illustrates such an alternative embodiment. There are again provided the chambers 22 and 26, but they are separated and connected by a connecting duct 21a.

According to another embodiment, the chamber or zone 26 consists of a simple duct connecting the reaction zone 22 to the post-combustion zone (the latter consisting of the swan-neck-shaped portion of the duct 24). The upstream portion of the duct 24 may be used for that purpose, the mineral material arriving in this case at the point 33b and no longer at the point 33a. The increase of the velocity of the suspension at the inlet of the duct 24 then permits to more effectively take up again the mineral material fed at 33b. In this case, the zone with a larger diameter upstream of the duct 24 would only be the reaction zone.

In a general manner, it should be understood that the words "chamber", "zone" or "duct" have no distinct meanings and only designate spaces or rooms where one or several physical and/or chemical phenomena are occurring and the sizes and shapes of which are adapted for providing a sufficient residence time and for permitting a correct development of (the said) phenomenon or phenomena and for providing a close contact between the gases being present and the material by means of turbulences promoting the mixings and the heat exchanges.

The use of either one of these words has no other purpose than facilitating the understanding of the present statement.

The preheater 1 may comprise ducts for contacting the powdery mineral material 6 with the hot combustion gases coming from the precalciner 2 and possibly from the firing furnace 4 through a duct such as 7, each conducting duct leading to a separator cyclone or the like permitting the gradual downward motion of the mineral batch or charge and the gradual rise of the combustion gases.

Such equipments are well-known from those skilled in the art and will not be described in detail (see for example W. H. DUDA, Cement Data Book, Bauverlag Wiesbaden and Berlin, third edition, pages 473 to 516).

In some cases, one portion of the combustion gases from the furnace 4 may be carried directly from the latter to the preheater (by-pass) without flowing through the precalciner, which however does not permit to profit by the full advantages of the invention in respect of the reduction of the content of nitrogen oxides in the smokes.

Some preheaters are of the double feeding kind with separate reheating circuits for distinct portions of the initial mineral batch or charge.

In this case, a separator such as 34 is not necessary or at the least is placed upstream of the preheater, and one of the reheated portions of the mineral material may directly reach the combustion chamber 20 and the other reheated portion may directly reach the contact chamber 26.

The cooler 5 may be of a conventional type such as described for example by W. H. DUDA, Cement Data Book, Bauverlag Wiesbaden and Berlin, third edition, pages 517 to 552 and will therefore be not otherwise described.

According to the method of the invention, it is essential on the one hand that sub-stoichiometric combustion conditions be provided in the combustion chamber 20 and on the other hand that the proportion of mineral material admitted into the combustion chamber 20 be controlled or checked in order that the temperature of the effluent from the chamber be at a temperature of 950° C. to 1,200° C. and preferably ranging from 1,000° C. to 1,100° C., when it enters the reaction chamber 22 and thus in order to reduce as much as possible the content of nitrogen oxides both in the gases coming from the combustion chamber 20 and in the smokes coming from the furnace 4. It also is essential that the combustion gases or smokes from the furnace 4 do not flow through the combustion chamber 20 and be admitted into the precalciner within the reaction chamber 22 only.

Another preferred characterizing feature of the invention is due to the fact that the combustion chamber is fed with a smaller amount of combustion air than the normally required amount for burning all the fuel admitted into the combustion chamber, i.e. for fully oxidizing, into $CO_2$ and $H_2O$, the main carbonaceous and hydrogenated components present in the fuel (sub-stoichiometric amount of oxygen). The complementary amount of air permitting a more complete combustion of the combustible materials is directly admitted into the post-combustion zone.

The atmosphere created in the combustion chamber and which is carried to the reaction chamber may therefore be qualified as being "reducing" since it contains chemical components such as C, CO and hydrocarbonic radicals which may be oxidized when permitting to obtaining two main effects:

providing a combustion with a small rate of nitrogen oxide in the combustion chamber 20 owing to a sub-stoichiometric combustion, destroying through chemical reaction the nitrogen oxides coming through 11 from the calcination or firing furnace, this destruction taking place in the reaction chamber 22.

The connections of the ducts 27 and 28 to the chamber 22 are preferably provided tangentially to the cylindrical body of this chamber for imparting a rotary motion to the gas in order to promote the turbulences and the centrifugation of the material on the walls. Owing to this fact, there is obtained a good thermal mixture between the gases, the mineral material and the fuel as well as a thermal protection of the walls by a coating effect of the material over the walls.

Hereinafter are stated preferred modes of carrying out or implementing the invention:

The speed of injection of the smokes rich in nitrogen oxides 11 into the reaction chamber is advantageously lying between 20 m/s and 40 m/s; the mean speed of the smokes within the reaction chamber is lying between 5 m/s and 20 m/s and preferably between 10 m/s and 15 m/s and the average speed of the smokes in the aforesaid duct 24 downstream of the injection of the third air flux is lying between 8 m/s and 24 m/s and preferably ranging from 12 m/s to 18 m/s.

It should be further specified here that with the embodiment of FIG. 2, the axial velocity of the pulverized fuel into the combustion chamber is advantageously lying between 10 m/s and 30 m/s and preferably ranging from 10 m/s to 18 m/s whereas the air under pressure supplied by the burner is injected into the said chamber with a speed higher than 75 m/s and preferably above 150 m/s.

The hot air is usefully subdivided into a first flow or stream 27 injected tangentially into the combustion chamber and representing from 40% to 85% of the total hot air flow, into a second flow or stream 28 injected at the level of the fuel supply into the combustion chamber and representing from 5% to 30% of the total hot air flow and into a third flow or stream 31 injected into the duct connecting the contact zone to the cyclone and representing from 10% to 50% of the main flow.

It should be specified here that the arrangement of the second flow or stream 28 permits to obtain a first combustion zone with fuel and air only in the absence of mineral material to be precalcined. This arrangement promotes the initiation or start of the combustion of fuels difficult to be burnt.

Preferably, the first flow or stream represents from 50% to 75%, the second flow or stream represents from 15% to 30% and the third flow or stream represents from 15% to 30% of the total hot air flow.

According to the invention there has thus been provided an equipment for and a process of precalcination resulting in exceptional advantages in particular with respect to the reduction or decrease of the emissions of nitrogen oxides which are harmful to the environment.

The invention is of course not at all limited to the embodiments described and illustrated which have been given by way of examples only.

On the contrary the invention comprises all the technical equivalents of the means described as well as their combinations if the latter are carried out according to its gist and within the scope of the appended claims.

What is claimed is:

1. An equipment for the calcination of a mineral material in a powdery form of the type comprising means for preheating a powdery mineral material, means for precalcining the preheated mineral material which are connected to the preheating means and means for the calcination of the precalcined mineral material which are connected to the precalcining means, wherein the precalcining means essentially comprise:

a. at least one combustion zone comprising means for feeding hot air, one portion of the preheated mineral material coming from the preheating means and fuel, b. at least one reaction zone communicating with the combustion zone and comprising means for feeding smokes coming from the calcining means, c. at least one post-combustion zone comprising means for feeding hot air and d. at least one cyclone the inlet of which communicates with the post-combustion zone and the outlets of which communicate with the preheating means and with the calcining means, respectively, wherein the improvement consists in that the equipment comprises a contact zone interposed between the reaction zone and the post-combustion zone, the said contact zone comprising means for feeding another portion of the preheated mineral material coming from the preheating means which has not passed through the combustion zone and the reaction zone.

2. An equipment according to claim 1, wherein the combustion zone comprises a burner and the means for feeding the combustion zone with hot air comprise at least one first duct opening tangentially into the combustion zone and at least one second duct opening tangentially into the combustion zone at the level of one burner so as to impart a same direction of rotation to the hot air coming from the ducts within the combustion zone.

3. An equipment according to claim 2, wherein the means for feeding the combustion zone with one portion of the preheated mineral material are connected to the first duct only, the burner only receiving hot air through the second duct.

4. A method of calcination of mineral materials with a reduced emission of nitrogen oxides, wherein the improvement consists in passing a mineral material successively into a preheating zone, a precalcining zone and a calcining zone, the precalcining zone successively comprising a combustion zone, a reaction zone, a contact zone, a post-combustion zone and a zone for the separation between the mineral material and the combustion gases, feeding the combustion zone with sub-stoichiometric air, feeding the post-combustion zone with air, feeding the combustion zone and the contact zone separately with mineral material from the preheating zone, feeding the reaction zone with smokes from the calcination zone, causing the effluent from the combustion zone to flow successively through the reaction zone, the contact zone, the post-combustion zone and the separation zone, conveying the separated combustion gases from the separation zone to the preheating zone, carrying the separated mineral material from the separation zone to the calcination zone and controlling the proportion of mineral material feeding the combustion zone with respect to the total amount of mineral material supplied to the precalcining zone to obtain a temperature of the effluent from the combustion zone lying between 950° C. and 1,200° C. at the inlet of the reaction zone.

5. A method according to claim 4, wherein the temperature of the effluent from the combustion zone ranges from 1,000° C. to 1,100° C. at the inlet of the reaction zone.

* * * * *